US008405742B2

(12) United States Patent
Lim (10) Patent No.: US 8,405,742 B2
(45) Date of Patent: Mar. 26, 2013

(54) PROCESSING IMAGES HAVING DIFFERENT FOCUS (75) Inventor: Jae S. Lim, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 741 days.

(21) Appl. No.: 12/346,247

(22) Filed: Dec. 30, 2008

(65) Prior Publication Data
US 2010/0165152 A1 Jul. 1, 2010

(51) Int. Cl.
*H04N 5/262* (2006.01)

(52) U.S. Cl. ............. 348/240.99; 348/345; 348/E5.045; 382/154; 382/276; 382/285

(58) Field of Classification Search .................. 348/349, 348/347, 348, 50
See application file for complete search history.

(56) References Cited

U.S. PATENT DOCUMENTS

| 6,034,690 | A * | 3/2000 | Gallery et al. | 345/419 |
|---|---|---|---|---|
| 6,111,979 | A * | 8/2000 | Katto | 382/154 |
| 6,320,979 | B1 * | 11/2001 | Melen | 382/154 |
| 6,625,333 | B1 * | 9/2003 | Wang et al. | 382/300 |
| 7,064,783 | B2 | 6/2006 | Colavin et al. | |
| 7,095,905 | B1 | 8/2006 | Peterson | |
| 7,239,805 | B2 | 7/2007 | Uyttendaele et al. | |
| 7,262,798 | B2 * | 8/2007 | Stavely et al. | 348/255 |
| 2002/0048395 | A1 * | 4/2002 | Harman et al. | 382/154 |
| 2007/0019883 | A1 * | 1/2007 | Wong et al. | 382/276 |
| 2008/0150945 | A1 * | 6/2008 | Wang et al. | 345/427 |
| 2008/0175576 | A1 * | 7/2008 | Hong et al. | 396/89 |
| 2008/0189036 | A1 * | 8/2008 | Elgersma | 701/211 |
| 2009/0109304 | A1 * | 4/2009 | Guan | 348/240.99 |
| 2009/0167930 | A1 * | 7/2009 | Safaee-Rad et al. | 348/347 |
| 2009/0195666 | A1 * | 8/2009 | Chen et al. | 348/218.1 |
| 2009/0324062 | A1 * | 12/2009 | Lim et al. | 382/162 |
| 2010/0033617 | A1 * | 2/2010 | Forutanpour | 348/345 |
| 2010/0046837 | A1 * | 2/2010 | Boughorbel | 382/173 |
| 2011/0069064 | A1 * | 3/2011 | Zhang et al. | 345/419 |
| 2012/0056984 | A1 * | 3/2012 | Zhang et al. | 348/43 |

OTHER PUBLICATIONS

Chibani, Youcef et al., "On the Use of the Redundant Wavelet Transform for Multisensor Image Fusion." IEEE, 2000, pp. 442-445.
Forster, Brigitte et al., "Extended Depth-of-Focus for Multi-Channel Microscopy Images: A Complex Wavelet Approach." IEEE, 2004, pp. 660-663.
Gabarda, Salvador et al., "On the use of a joint spatial-frequency representation for the fusion of multi-focus images." Pattern Recognition Letters, 26 (2005), pp. 2572-2578.
Goldsmith, Noel T., "Deep Focus; A Digital Image Processing Technique to Produce Improved Focal Depth in Light Microscopy." Image Anal Stereol, 19, 2000, pp. 163-167.

(Continued)

*Primary Examiner* — Roberto Velez
*Assistant Examiner* — Abdelaaziz Tissire
(74) *Attorney, Agent, or Firm* — Occhiuti Rohlicek & Tsao LLP (57) ABSTRACT

Processing images of a scene taken with different focus includes, for each of at least some of the images, determining at least one portion of the image having a predetermined characteristic. A representation of the scene is generated that includes an array of elements, where each of at least some of the elements corresponds to a determined portion of at least one of the images. An element of the array is based on a correspondence between a distance associated with a determined portion of at least one image and a focused distance associated with at least one image. The generated representation is stored or provided as output.

29 Claims, 3 Drawing Sheets

OTHER PUBLICATIONS

Li, Shutao et al., "Fusing Images With Different Focuses Using Support Vector Machines." IEEE Transactions on Neural Networks, vol. 15, No. 6, Nov. 2004, pp. 1555-1561.

Meneses, Jaime et al., "Extended depth of field using shapelet-based image analysis." Applies Optics, vol. 47, No. 2, Jan. 10, 2008, pp. 169-178.

Shade, Jonathan, "Layered Depth Images." SIGGRAPH 98, Orlando Florida, Jul. 19-24, Cimputer Graphics Proceedings, Annual Conference Series, 1998, pp. 231-242.

Shum, Heung-Yeung et al., "A Review of Image-based Rendering Techniques." Online <http://research.microsoft.com/pubs/68826/review_image_rendering.pdf>, Jun. 2000, pp. 1-12.

Tympel, Volker, "A new high level image capture system for the conventional light miscroscopy." SPIE, vol. 2707, Apr. 15, 1996 pp. 529-536.

Valdecasas, A.G. et al., "On the extended depth of focus algorithms for bright field microscopy." Micron, 32 (2001), pp. 559-569.

* cited by examiner

PROCESSING IMAGES HAVING DIFFERENT FOCUS

BACKGROUND

This description relates to processing images having different focus.

Various techniques for processing images of a three-dimensional (3D) scene (e.g., a location or object) take into account the focus used to capture an image of the scene. For example, in extended depth of focus algorithms for microscopy, a series of multiple images taken with different focus can be used to incorporate 3D information into a two-dimensional (2D) composite image. Each image can be analyzed to determine which portions of the image are more in-focus. In general, areas that are more in-focus give rise to sharper edges that can be detected using mathematical techniques (e.g., detecting high frequency components of a spatial transform).

SUMMARY

In one aspect, in general, a method for processing images of a scene taken with different focus includes, for each of at least some of the images, determining at least one portion of the image having a predetermined characteristic. A representation of the scene is generated that includes an array of elements; where each of at least some of the elements corresponds to a determined portion of at least one of the images. An element of the array is based on a correspondence between a distance associated with a determined portion of at least one image and a focused distance associated with at least one image (e.g., the correspondence can be between a distance associated with the determined portion received as input and a focused distance that are used together to derive an element of the array, or between a distance associated with the determined portion represented by an element of the array and a focused distance used to derive that distance). The generated representation is stored or provided as output.

Aspects can include one or more of the following features.

At least some of the elements of the array each represent an intensity for a given part of the scene.

The generated representation of the scene comprises a composite image in which a portion of the composite image representing a given part of the scene is derived from at least one of the images in which the given part of the scene is most in focus.

An element of the array is derived from a first portion of a first of the images that represents a given part of the scene, and the correspondence between a distance associated with the first portion of the first image and a focused distance associated with the first image indicates that the given part of the scene is more in focus in the first image than in any of the other images.

The element of the array comprises the first portion of the first image.

The element of the array is derived from an interpolation between the first portion of the first image and a corresponding second portion of a second of the images.

At least some of the elements of the array each represent a distance to a given part of the scene.

The generated representation of the scene comprises a depth map in which each distance associated with a given part of the scene is derived from a focused distance associated with at least one of the images in which the given part of the scene is most in focus.

Generating the depth map comprises adjusting an initial distance estimate associated with the given part of the scene based on the focused distance.

The initial distance estimate associated with the given part of the scene is received from an initial depth map of the scene.

Determining at least one portion of a given image having a predetermined characteristic comprises measuring a local characteristic of each of multiple portions of the given image.

The local characteristic comprises local variation in intensity.

An element of the array representing a distance corresponds to portions of the images representing a given part of the scene, and the element of the array is derived from a focused distance associated with a given image for which the local variation of the corresponding portion is larger than the local variation of corresponding portions of the other images.

Measuring the local characteristic comprises calculating a value of a two-dimensional variance function.

Determining at least one portion of a given image having a predetermined characteristic comprises comparing a distance associated with the given portion of the given image to a focused distance associated with the given image.

The distance associated with the given portion of the given image is derived from a depth map of the scene.

An element of the array is derived from a portion of an image for which the focused distance is closer to the associated distance than the focused distances associated with the other images.

Each of at least some of the portions of an image comprises one or more pixels of a digital image.

The method further comprises capturing each of the images of the scene with a different focus.

The method further comprises storing information indicating the focus at which each of the images was captured.

Each of the images represents substantially the same view of the scene.

In another aspect, in general, a method for generating an image of a scene includes receiving a first representation of the scene comprising a first array of elements that each represents an intensity for a given part of the scene; receiving a second representation of the scene comprising a second array of elements that each represents a distance to a given part of the scene; generating an image of the scene in which each portion of the generated image is based on an element from the first array and an element from the second array that represent substantially the same part of the scene; and storing the generated image or providing the generated image as output.

Aspects can include one or more of the following features.

Generating the image of the scene comprises applying a blurring function to a plurality of intensity values from the first array based on at least one distance value from the second array and a target focused distance.

Generating the image of the scene comprises applying a blurring function to a plurality of intensity values from the first array based on a difference between a distance value from the second array and a target focused distance.

The distance value from the second array represents a distance to a part of the scene represented by at least one of the plurality of intensity values to which the blurring function is being applied.

In another aspect, in general, a computer-readable medium stores a computer program for processing images of a scene taken with different focus. The computer program comprises instructions for causing a computer system to: for each of at least some of the images, determine at least one portion of the image having a predetermined characteristic; generate a representation of the scene comprising an array of elements, where each of at least some of the elements corresponds to a determined portion of at least one of the images. An element of the array is based on a correspondence between a distance associated with a determined portion of at least one image and a focused distance associated with at least one image. The computer program also comprises instructions for causing a computer system to store the generated representation or provide the generated representation as output.

In another aspect, in general, a system comprises an image capture subsystem configured to capture images of a scene taken with different focus; and an image processing subsystem configured to, for each of at least some of the images, determine at least one portion of the image having a predetermined characteristic, and generate a representation of the scene comprising an array of elements, where each of at least some of the elements corresponds to a determined portion of at least one of the images. An element of the array is based on a correspondence between a distance associated with a determined portion of at least one image and a focused distance associated with at least one image.

Among the many advantages of the invention (some of which may be achieved only in some of its various aspects and implementations) are the following.

By using multiple pictures taken with different focus to process depth information about a scene or extract depth information about a scene, accurate 3D representations of the scene can be generated. One example of depth information is a depth map, which can be represented as a 2D array that estimates the distances from a camera to respective locations of a scene that are represented by a given element of the array. A depth map can be generated as output by processing pictures. A depth map can be used as input for processing the pictures to generate a sharpened image of the scene. In some examples, an initial depth map is received as input and a processed depth map is generated as output that is more accurate than the initial depth map. Depth information about a scene and known focus information (e.g., focused distances) for a set of pictures of the scene can be used to more accurately process the pictures to generate a sharpened picture. The process of generating the sharpened pictures can be used in a variety of applications including 3D video applications or image recreation or simulation (e.g., simulating a picture taken with a given focus).

Other features and advantages of the invention will become apparent from the following description, and from the claims.

DESCRIPTION

The term "comprising" and variations thereof as used herein are used synonymously with the term "including" and variations thereof and are open, non-limiting terms.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
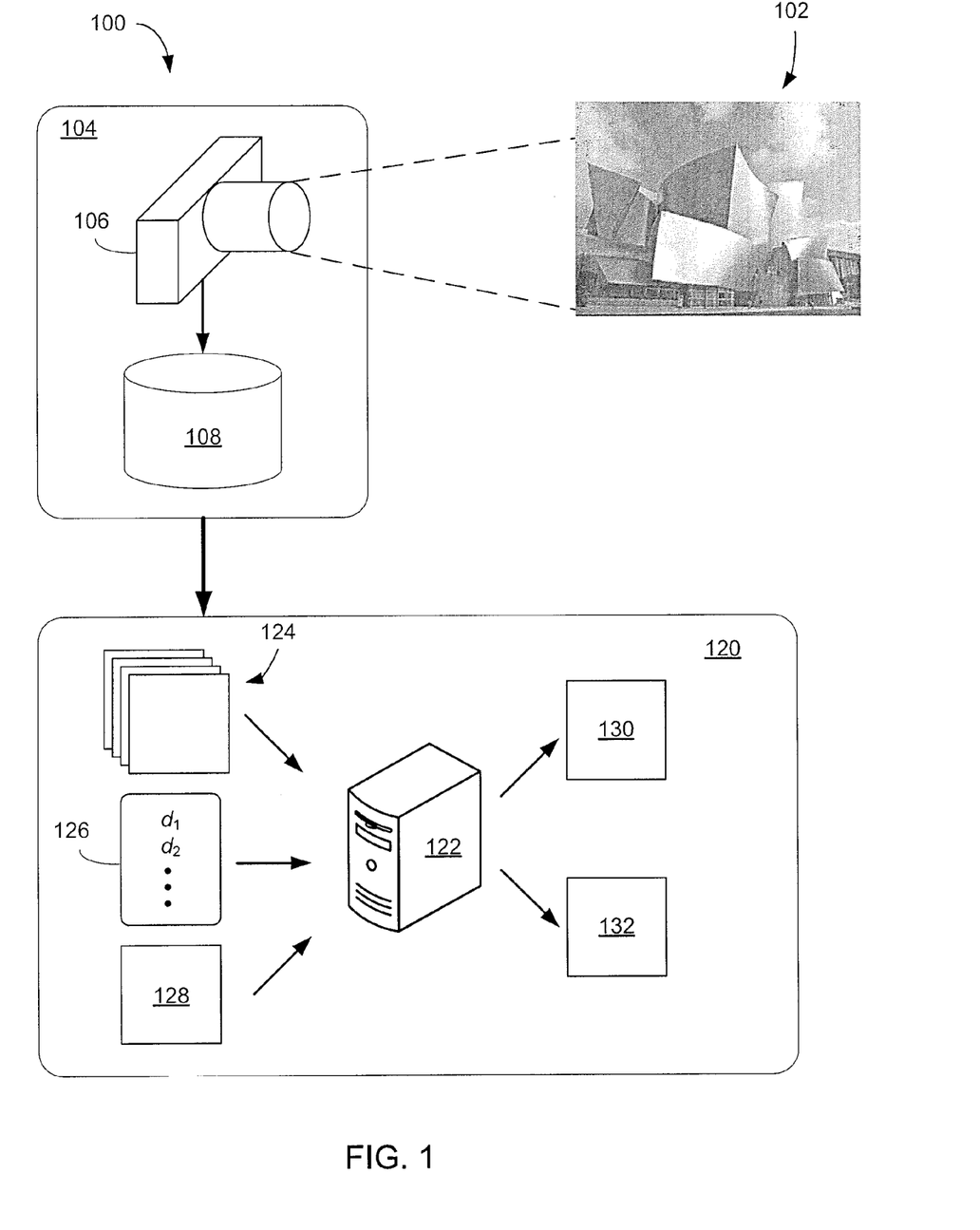
FIG. 1 is a diagram of a system for capturing and processing images of a scene.

FIG. 1 shows a system 100 for capturing and processing images of a scene 102 includes an image capture subsystem 104 and an image processing subsystem 120. The image capture subsystem 104 includes a camera 106 and a storage module 108 for storing captured pictures (e.g., digital images) and other related information about the pictures or the scene 102. For example, in some implementations, the image capture subsystem 104 is configured to capture a depth map that estimates the distances from the camera 106 to the locations of the scene 102 represented in the depth map. The depth map can be acquired using any of a variety of techniques (e.g., techniques used by the ZCam camera available from 3DV Systems, or techniques used by the Axi-vision camera available from NHK Science & Technical Research Laboratories).

The pictures captured by the image capture subsystem 104 are organized into "picture sets." Each picture set includes multiple pictures of substantially the same view of the scene 102 each taken with a different focus setting. For some applications, the subsystem 104 is configured to capture a single picture set for a given scene. For some applications the subsystem 104 is configured to capture multiple picture sets for a scene. For example, for 3D video each picture set may correspond to a frame in the 3D video signal with the focus scanning periodically over a given range. To ensure that each picture in a picture set has substantially the same view of the scene, the scene may be still or may be moving but may change relatively little during the time over which the pictures in the set are captured (the "set capture time"). For example, if over the set capture time nothing in the scene moves significantly the processing techniques can still be used, though perhaps with less effectiveness. In some implementations, motion compensation techniques can also be used to improve effectiveness.

Figure 2:
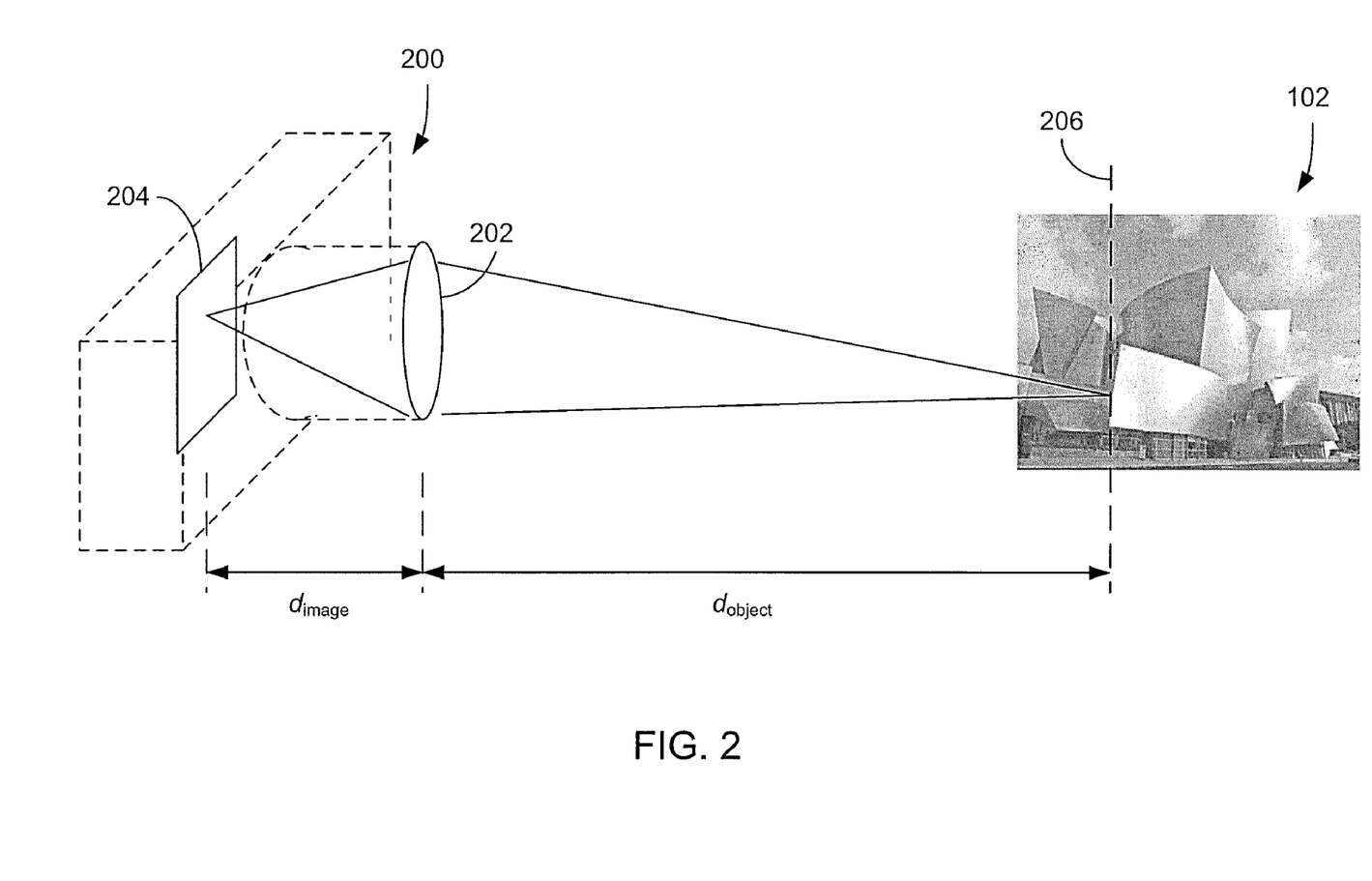
FIG. 2 is a schematic diagram showing image and object planes for a given focus.

Referring to FIG. 2, for an exemplary camera 200, the focus can be changed for each picture in a picture set by scanning imaging optics 202 (e.g., one or more lenses) relative to an imaging sensor 204 (e.g., a CCD array) so that the focused distance is different for each picture. The focused distance (also known as the "object distance") is the distance between the imaging optics 202 and the object plane 206. The object plane 206 represents the plane that is optimally focused onto the imaging optics 202. The location of the object plane 206 is determined by characteristics of the camera 200 and does not depend on the actual locations of structures or objects in a scene. Typically, not all structures or objects represented in a picture of a scene will be located at the object plane 206. The closer a location in the scene is to the object plane 206, the sharper it will be in the picture. Under an approximation that models the optics 202 as a single thin lens with focal length F, the relationship between the focused distance (the distance $d_{object}$ between the object plane 206 and the optics 202) and the image distance (the distance $d_{image}$ between the optics 202 and the imaging sensor 204) is given by $$\frac{1}{d_{object}} = \frac{1}{F} - \frac{1}{d_{image}}.$$

The focused distance for the different focus settings may be calculated differently depending on the type of optics used by the camera 200. In general, by recording sufficient information about the position and focal properties of the optics 202 at the time a picture is taken, the corresponding focused distance can be calculated.

The focus setting can be changed from one picture to the next so that the focused distances in a picture set cover a range of distances from a desired minimum value to a desired maximum value. For example, the focused distances can be incremented by a step value from one picture to the next. The number of pictures in a picture set can be large enough to provide a large resolution of distance discrimination when comparing with an input depth map or for generating an output depth map (e.g., more than 100 pictures or more than 1000 pictures). In some implementations the step value is uniform, and in some implementations the step value changes so that the resolution of distance discrimination provided by the picture set is greater over a selected subrange.

Referring again to FIG. 1, the image processing subsystem 120 includes a processing engine 122 such as a general purpose or special purpose computer that operates according to a computer program provided on a computer-readable storage medium (e.g., solid state or magnetic or optical media) or delivered over a communication medium of a network. The image processing subsystem 120 receives a picture set 124 from the image capture subsystem 104, and depending on the mode of operation as described in more detail below, receives related information such as focus information 126 (e.g., focused distances) and an initial depth map 128. The image processing subsystem 120 stores a generated picture 130 or depth map 132 for later use, or provides the generated picture 130 or depth map 132 as output for display or additional processing.

Figure 3A:
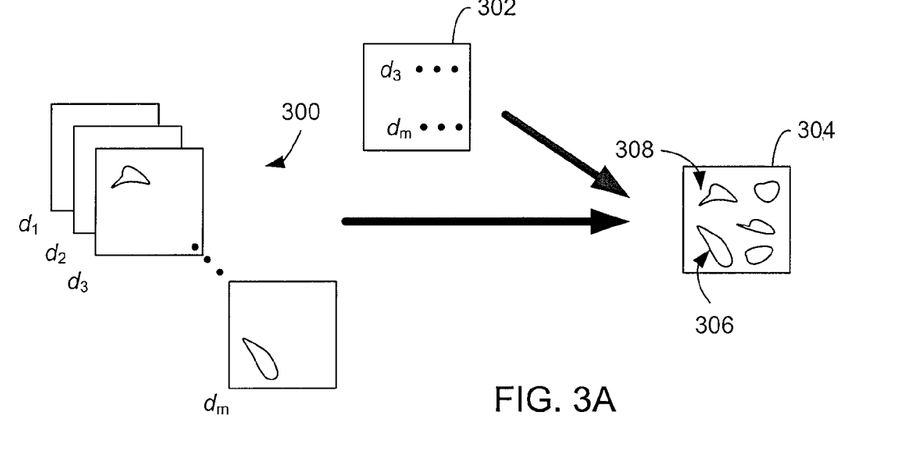
FIGS. 3A-3C are schematic diagrams illustrating operating modes of the system.
Figure 3B:
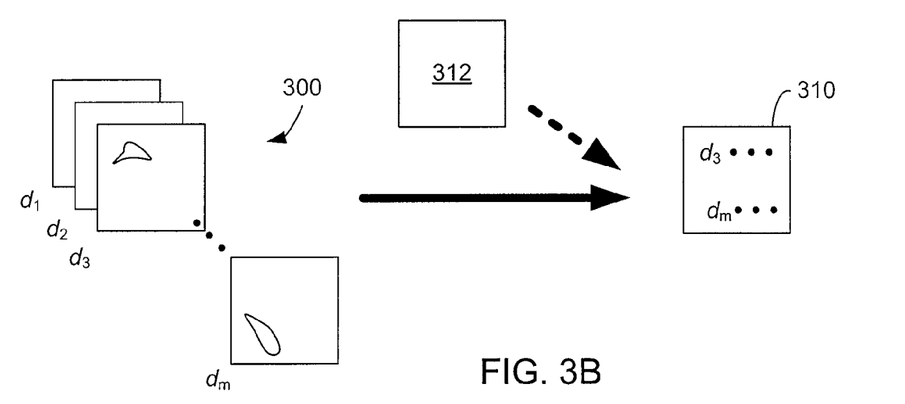
Figure 3C:
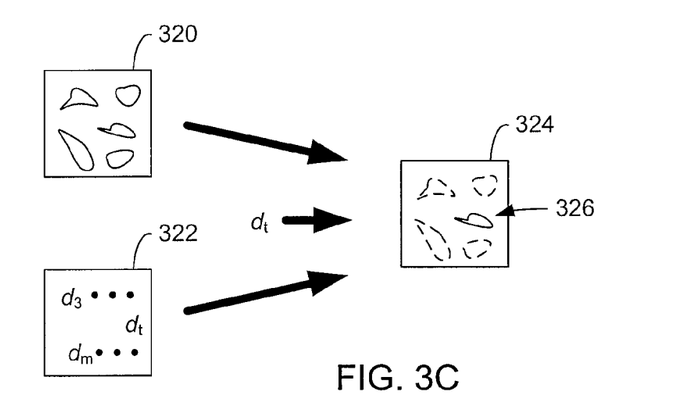

The system 100 has various modes of operation in which pictures can be captured and used to extract information about the scene 102, or can be generated to represent the scene 102 based on previously stored pictures. Referring to FIG. 3A, in a "sharpening mode" the system 100 processes a picture set 300 using a depth map 302 to generate a sharpened picture 304 without the blurring caused by the limited depth of focus of the camera 106. Referring to FIG. 3B, in a "depth mode" the system 100 processes a picture set 300 to generate a depth map 310 for the scene 102. In some cases the generated depth map 310 is an enhanced depth map based on an initial depth map 312 provided by the image capture subsystem 104. Referring to FIG. 3C, in a "blurring mode" the system 100 processes a sharp picture 320 of the scene (either generated by the system 100 or obtained from another source) using a depth map 322 to generate a simulated picture 324 that simulates the characteristics (e.g., blurring) of being acquired at a selected focus setting of a camera.

In the following examples, $f_i(n_1,n_2)$ represents an array of pixel intensity for each of the multiple pictures in a picture set, where i represents the $i^{th}$ focus, and coordinates $(n_1,n_2)$ represent the pixel location within a given picture. The value of the function $f_i(n_1,n_2)$ represents a pixel intensity according to any of a variety of formats for encoding digital images (including color or grayscale images). With a particular focus, the parts of the scene at a distance corresponding to the focus are sharply focused, while other parts of the scene are blurred with more blurring for parts more different from the focused distance. This means that $f_i(n_1,n_2)$ is more sharply focused in different regions of the scene 102 for a different i.

In the sharpening mode and the depth mode, the focus information (e.g., the focused distance) for each i is known. In some implementations, the image capture subsystem 104 stores the focus information for each i and provides this information to the image processing subsystem 120. In some implementations, the image processing subsystem 120 may receive the focus information for each i from a different source.

In the sharpening mode, the image processing subsystem 120 combines different parts of the multiple pictures $f_i(n_1,n_2)$ from the picture set 300 to obtain one sharpened picture 304 represented by $g(n_1,n_2)$ that is more focused everywhere in the scene than any of the pictures $f_i(n_1,n_2)$. The subsystem 120 receives the focused distance $d_{object}^i$ for each i and the depth map 302 represented by $D(n_1,n_2)$. Different granularities can be used to determine the size of individual segments of different pictures that are combined to generate the sharpened picture 304. In this example a granularity of one pixel is used for the "segment size." The primed values $n'_1$ and $n'_2$ in the following description indicate specific values of the variables $n_1$ and $n_2$. To generate a value $g(n'_1,n'_2)$ of the sharpened picture 304 at a given pixel location $(n'_1,n'_2)$, the image processing subsystem 120 compares the distance $D(n'_1,n'_2)$ from the depth map 302 evaluated at the same pixel location $(n'_1,n'_2)$ with each of the focused distances $d_{object}^i$ to select the focused distance closest to the distance $D(n'_1,n'_2)$ and the resulting value of $i=i_{sel}$ for the selected focused distance. This correspondence between the depth map distance at the pixel location $(n'_1,n'_2)$ and the focused distance associated with the picture $f_{i_{sel}}(n_1,n_2)$ indicates that the intensity for the pixel $(n'_1,n'_2)$ is more in focus in the picture $f_{i_{sel}}(n_1,n_2)$ than in any of the other pictures. The sharpened picture value is then selected as $g(n'_1,n'_2)=f_{i_{sel}}(n'_1,n'_2)$. Alternatively, in some implementations, if the distance $D(n'_1,n'_2)$ falls between two focused distances, the sharpened picture value $g(n'_1,n'_2)$ can be one of the two or can be calculated based on an interpolation between the corresponding values of $f_i(n'_1,n'_2)$.

In the example shown in FIG. 3A, the sharpened picture 304 includes a segment 306 from the lower left of a picture whose focused distance $d_m$ matched the focused distance given in the lower left of the depth map 302. Similarly, the picture 304 includes a segment 308 from the upper left of a picture whose focused distance $d_3$ matched the focused distance given in the upper left of the depth map 302.

In the depth mode, the image processing subsystem 120 measures a local characteristic of each segment of each of the multiple pictures $f_i(n_1,n_2)$ from the picture set 300 to generate a depth map 310 based on the focused distances of selected pictures. The local characteristic indicates which parts of the scene were most in focus when the picture was captured. In this example, each pixel is associated with a local characteristic value, and any number of pixels in a local neighborhood of the pixel being analyzed can be used in the calculation of the local characteristic value, as described in more detail below. The subsystem 120 receives the focused distance $d_{object}^i$ for each i. The depth map distance $D(n'_1,n'_2)$ for a given pixel $(n'_1,n'_2)$ is estimated as the focused distance for the picture that is the most in focus at that pixel $(n'_1,n'_2)$ according to the measured local characteristic. In some implementations, the calculated depth map distance is based on an interpolation between the corresponding focused distances of multiple pictures.

In the example shown in FIG. 3B, the upper left region of the depth map 310 indicates a distance $d_3$ based on the focused distance of a picture with the sharpest image in that upper left region. Similarly, lower left region of the depth map 310 indicates a distance $d_m$ based on the focused distance of a picture with the sharpest image in that lower left region.

An example of a local characteristic that can be measured is the "local variance" which quantifies a local variation in intensity. When a region of an image is more 15 sharply focused, the details are clearer and the local variance increases. Thus, the depth map distance for a given pixel can be estimated from a focused distance associated with a given picture for which the local variance of that pixel is larger than the local variance of corresponding pixels of the other pictures.

For each $i^{th}$ picture, the image processing subsystem 120 can compute the local variance measure $v_i(n_1,n_2)$ by $$v_i(n_1, n_2) = \sum_{l_1=n_1-M_1}^{n_1+M_1} \sum_{l_2=n_2-M_2}^{n_2+M_2} (f_i(l_1, l_2) - m_i(l_1, l_2))^2$$

where the local window used to compute the variance at $(n_1,n_2)$ in the above equation is a rectangular area of $(2M_1+1) \times (2M_2+1)$, and the local mean $m_i(n_1,n_2)$ is the average over the local window or some low-pass filtered version.

The equation shown above is just an example. There are many variations that are possible. The window used for local variance can be shaped differently from the rectangular region. The window used for the local mean can be different from the window used for the local variance. The low-pass filter used to measure the local mean can be a reasonable smoothing filter with impulse response $h(n_1,n_2)$ when $h(n_1, n_2)$ approximately satisfies $$\sum_{n_1} \sum_{n_2} h(n_1, n_2) = 1.$$

The picture $f_i(n_1,n_2)$ can represent a grayscale picture, or a color picture. In the case of a color picture, one particular color component or some combination of the three color components such as the luminance component of the color picture can be used to compute the local variance. The local characteristic measured can be some variation of the local variance, for example, the absolute value rather than the squaring operation can be used in the equation shown above.

The image processing subsystem 120 can optionally use an initial depth map 312 obtained from the image capture subsystem 104 or another source, to generate a more accurate depth map 310. For example, the distances given by the initial depth map 312 can be adjusted based on the corresponding focused distances based on a predetermined criteria (e.g., if the highest local variance for a segment is larger than a predetermined threshold). The generated depth map 310 can then be used as the depth map 302 in the sharpening mode for combining the pictures $f_i(n_1,n_2)$ to generate the sharpened picture 304.

In the blurring mode, the system 100 processes a sharp picture 320 of the scene using a depth map 322 to generate a simulated picture 324 that simulates the characteristics (e.g., blurring) of being acquired at a focus setting that corresponds to a target focused distance. The image processing subsystem 120 may receive the sharp picture 320 as the result of processing the picture set 300 in the sharpening mode, and may receive the depth map 322 as a result of processing the picture set 300 in the depth mode. Alternatively, the sharp picture 320 and/or the depth map 322 may be received from a different source. Any of a variety of techniques can be used to determine how much blurring to apply to a given segment of the sharp picture 320. For example, the image processing subsystem 120 may apply a blurring function to intensity values from the sharp picture 320 centered at a given pixel $(n'_1,n'_2)$ based on a difference between a depth map distance $D(n'_1,n'_2)$ at that pixel and the target focused distance $d_t$. The larger the difference the more blurring is applied, according to a predicted transformation of light through the optics of a camera to be simulated.

In the example of FIG. 3C, the simulated picture 324 is generated based on processing the sharp picture 320 to simulate a picture that was captured with a target focused distance of $d_t$. Because the depth map 322 indicates that a middle right region of the scene was at that target focused distance $d_t$, the middle right region 326 of the simulated picture 324 is sharply focused, while regions at other distances are blurred based on how far their depth map distances are from the target focused distance.

The image processing techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Other embodiments are within the scope of the following claims.

What is claimed is:

1. A method for processing images of a scene taken with different focus, comprising:
   receiving the images of the scene taken with different focus and an initial depth map of the scene;
   for each of at least some of the images, measuring a local characteristic of each of multiple portions of the image and determining at least one portion of the image having a local variation in intensity that is larger than the local variation in intensity of corresponding portions of the other images;
   comparing an initial distance from the initial depth map associated with a particular portion of the image to a focused distance associated with the image for which the local variation of the particular portion of the image is larger than the local variation of the particular portion of the other images;
   generating an adjusted depth map of the scene comprising an array of elements, where each of at least some of the elements corresponds to a respective portion of at least one of the images, wherein at least one element of the array is based on an initial distance from the initial depth map adjusted based on the compared focused distance; and
   storing the generated adjusted depth map or providing the generated adjusted depth map as output.

2. The method of claim 1, wherein at least some of the elements of the array each represent an intensity for a given part of the scene.

3. The method of claim 1, wherein the element of the array is based on the initial distance from the initial depth map adjusted based on the compared focused distance associated with a first of the images and a focused distance associated with a second of the images.

4. The method of claim 3, wherein the element of the array is based on the initial distance from the initial depth map adjusted based on an interpolation between the focused distance associated with the first image and the focused distance associated with the second image.

5. The method of claim 1, wherein the generated adjusted depth map of the scene comprises a depth map in which at least one distance associated with a given part of the scene is adjusted based on a focused distance associated with at least one of the images in which the given part of the scene is most in focus.

6. The method of claim 1, wherein each of at least some of the portions of an image comprises one or more pixels of a digital image.

7. The method of claim 1, further comprising capturing each of the images of the scene with a different focus.

8. The method of claim 7, further comprising storing information indicating the focus at which each of the images was captured.

9. The method of claim 1, wherein each of the images represents substantially the same view of the scene.

10. A non-transitory computer-readable medium storing a computer program for processing images of a scene taken with different focus, the computer program comprising instructions for causing a computer system to:
receive the images of the scene taken with different focus and an initial depth map of the scene;
for each of at least some of the images, measure a local characteristic of each of multiple portions of the image and determine at least one portion of the image having a local variation in intensity that is larger than the local variation in intensity of corresponding portions of the other images;
compare an initial distance from the initial depth map associated with a particular portion of the image to a focused distance associated with the image for which the local variation of the particular portion of the image is larger than the local variation of the particular portion of the other images;
generate an adjusted depth map of the scene comprising an array of elements, where each of at least some of the elements corresponds to a respective portion of at least one of the images, wherein at least one element of the array is based on an initial distance from the initial depth map adjusted based on the compared focused distance; and
store the generated adjusted depth map or provide the generated adjusted depth map as output.

11. A system, comprising:
an image capture subsystem configured to capture images of a scene taken with different focus; and
an image processing subsystem configured to
receive the images of the scene taken with different focus and an initial depth map of the scene,
for each of at least some of the images, measure a local characteristic of each of multiple portions of the image and determine at least one portion of the image having a local variation in intensity that is larger than the local variation in intensity of corresponding portions of the other images,
compare an initial distance from the initial depth map associated with a particular portion of the image to a focused distance associated with the image for which the local variation of the particular portion of the image is larger than the local variation of the particular portion of the other images, and
generate an adjusted depth map of the scene comprising an array of elements, where each of at least some of the elements corresponds to a respective portion of at least one of the images, wherein at least one element of the array is based on an initial distance from the initial depth map adjusted based on the compared focused distance.

12. The method of claim 1, wherein adjusting the initial distance from the initial depth map based on the compared focused distance includes determining that the local variation of the corresponding portion of the image taken with the compared focused distance is larger than a predetermined threshold.

13. The method of claim 1, wherein the initial depth map of the scene is received from a different source than a source of the images of the scene.

14. The medium of claim 10, wherein at least some of the elements of the array each represent an intensity for a given part of the scene.

15. The medium of claim 10, wherein the element of the array is based on the initial distance from the initial depth map adjusted based on the compared focused distance associated with a first of the images and a focused distance associated with a second of the images.

16. The medium of claim 15, wherein the element of the array is based on the initial distance from the initial depth map adjusted based on an interpolation between the focused distance associated with the first image and the focused distance associated with the second image.

17. The medium of claim 10, wherein the generated adjusted depth map of the scene comprises a depth map in which at least one distance associated with a given part of the scene is adjusted based on a focused distance associated with at least one of the images in which the given part of the scene is most in focus.

18. The medium of claim 10, wherein each of at least some of the portions of an image comprises one or more pixels of a digital image.

19. The medium of claim 10, wherein each of the images represents substantially the same view of the scene.

20. The medium of claim 10, wherein adjusting the initial distance from the initial depth map based on the compared focused distance includes determining that the local variation of the corresponding portion of the image taken with the compared focused distance is larger than a predetermined threshold.

21. The medium of claim 10, wherein the initial depth map of the scene is received from a different source than a source of the images of the scene.

22. The system of claim 11, wherein at least some of the elements of the array each represent an intensity for a given part of the scene.

23. The system of claim 11, wherein the element of the array is based on the initial distance from the initial depth map adjusted based on the compared focused distance associated with a first of the images and a focused distance associated with a second of the images.

24. The system of claim 23, wherein the element of the array is based on the initial distance from the initial depth map adjusted based on an interpolation between the focused distance associated with the first image and the focused distance associated with the second image.

25. The system of claim 11, wherein the generated adjusted depth map of the scene comprises a depth map in which at least one distance associated with a given part of the scene is adjusted based on a focused distance associated with at least one of the images in which the given part of the scene is most in focus.

26. The system of claim 11, wherein each of at least some of the portions of an image comprises one or more pixels of a digital image.

27. The system of claim 11, wherein each of the images represents substantially the same view of the scene.

28. The system of claim 11, wherein adjusting the initial distance from the initial depth map based on the compared focused distance includes determining that the local variation of the corresponding portion of the image taken with the compared focused distance is larger than a predetermined threshold.

29. The system of claim 11, wherein the initial depth map of the scene is received from a different source than the image capture subsystem.

* * * * *